US008713306B1

(12) United States Patent
Bennett

(10) Patent No.: US 8,713,306 B1
(45) Date of Patent: Apr. 29, 2014

(54) NETWORK DECOYS

(75) Inventor: Jeremy Bennett, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 2475 days.

(21) Appl. No.: 10/684,979

(22) Filed: Oct. 14, 2003

(51) Int. Cl.
*H04L 29/00* (2006.01)

(52) U.S. Cl.
USPC ............. 713/154; 705/51; 370/252; 370/329; 370/335; 370/338; 709/220; 709/222; 709/224

(58) Field of Classification Search
USPC ........... 726/22, 24, 25; 705/51; 370/252, 329, 370/338, 335; 709/220, 222, 223, 224; 713/154
See application file for complete search history.

(56) References Cited

U.S. PATENT DOCUMENTS

| 6,757,723 B1* | 6/2004 | O'Toole et al. ............... 709/222 |
|---|---|---|
| 2002/0152303 A1* | 10/2002 | Dispensa ...................... 709/224 |
| 2003/0009540 A1* | 1/2003 | Benfield et al. ............... 709/220 |
| 2003/0039212 A1* | 2/2003 | Lloyd et al. .................... 370/235 |
| 2003/0063717 A1* | 4/2003 | Holmes ...................... 379/88.04 |
| 2003/0137930 A1* | 7/2003 | Futernik ........................ 370/216 |
| 2003/0152095 A1* | 8/2003 | Foore et al. ................... 370/412 |
| 2003/0195852 A1* | 10/2003 | Campbell et al. ............... 705/51 |
| 2003/0219008 A1* | 11/2003 | Hrastar ......................... 370/352 |
| 2004/0181595 A1* | 9/2004 | Banerjee et al. ............... 709/226 |
| 2004/0210649 A1* | 10/2004 | Bhogal et al. ................. 709/222 |

OTHER PUBLICATIONS

Niels Provos, Honeyd: *A Virtual Honeypot Daemon* (Extended Abstract), Center for Information Technology Integration, University of Michigan.
Provos, N. "A Virtual Honeypot Framework", USENIX Association, Proceedings of the 13th USENIX Security Symposium, Aug. 9-13, 2004, 15 pages.

* cited by examiner

*Primary Examiner* — Beemnet Dada
*Assistant Examiner* — Sayed Beheshti Shirazi
(74) *Attorney, Agent, or Firm* — Wilmer Cutler Pickering Hale and Dorr LLP

(57) ABSTRACT

A technique for providing computer security is described. The technique comprises providing network configuration information on a dynamic network; determining whether the network configuration information meets a criterion; and in the event the configuration information meets the criterion, configuring a decoy associated with the network.

19 Claims, 5 Drawing Sheets

US 8,713,306 B1

NETWORK DECOYS

FIELD OF THE INVENTION

The present invention relates generally to network security. More specifically, a technique for deploying a decoy is disclosed.

BACKGROUND OF THE INVENTION

Network security is an important issue in modern computer networks. An effective way of preventing attacks is to intercept and identify suspicious activities before they affect the real systems. Decoys, also referred to as honeypots, are often deployed for this purpose. Products such as NetFacade and Neils Provos' honeyd can be used to imitate real production systems on a network and aim to collect information about probes, attacks, and compromises that would otherwise target actual systems. Suspicious activities are usually reported so that further actions can be taken.

In static networks where devices are assigned known static IP addresses, deploying decoys is typically accomplished by assigning some unused static IP addresses as decoy addresses. Assigning decoy sometimes involves manual configuration by a network administrator or similarly privileged user, and usually requires knowledge of the configuration of the network.

In dynamic networks, devices are assigned dynamic addresses that may change over time, making the assignment of decoy addresses more difficult. Thus, decoys are typically not deployed in dynamic networks. Leaving dynamic networks unprotected by decoys weakens the security of the environment since pre-attack activities may go undetected. Knowing that the dynamic desktop environments are often less secure, attackers typically attack these environments first.

It would be useful to have a technique that would allow for deployment of decoys in a dynamic network. It would also be useful if the technique would not disrupt the normal operations of the network during deployment and operation.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

A technique for computer security is disclosed. In some embodiments, a decoy on a dynamic network is configured if information about the network's configuration meets a criterion. For example, based on certain criteria, a free address may be assigned to a decoy, or a decoy address may be released and become available to other devices. The technique allows for deployment of decoys on a dynamic network.

As used herein, a decoy refers to any software code, hardware component, software/hardware combination or any other appropriate form of resource used for detecting unauthorized or illicit use of that resource. Some decoys perform the detection by substantially emulating a real device on the network. Decoys range in capability from low interaction systems that emulate a basic set of services to fully functional operating systems that can be probed, attacked and compromised. The technique discussed is applicable to all decoy types.

Figure 1:
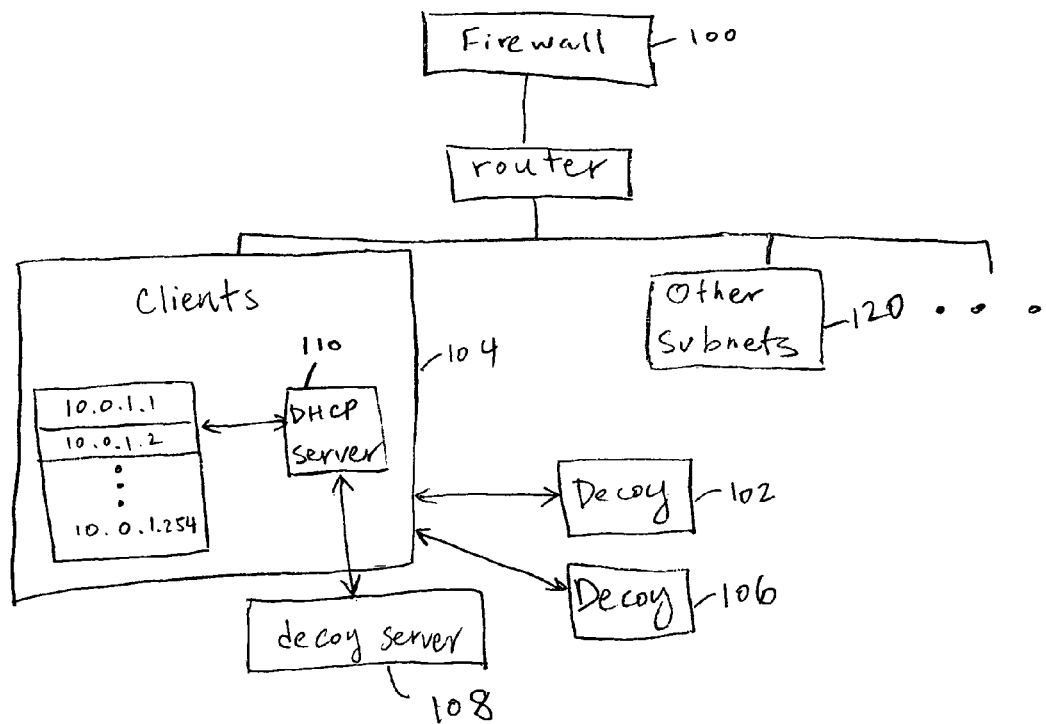
FIG. 1 is a block diagram illustrating the deployment of decoys in a dynamic network, according to one embodiment.

FIG. 1 is a block diagram illustrating the deployment of decoys in a dynamic network, according to one embodiment. The capability of deploying decoys may be implemented in various components such as decoy servers, decoy managers, a server that assists devices on the network to connect and obtain addresses such as a dynamic host configuration protocol (DHCP) server, or any other appropriate software, hardware or software/hardware combination. For the purposes of illustration, deploying decoys using a decoy server is discussed in the following examples.

In this example, a corporate network behind a firewall 100 is divided into several subnets, including a client subnet 104 that uses dynamic addresses. A decoy server 108 deploys multiple decoys such as 102 and 106 automatically. The decoys intercept and process traffic on client subnet 104. They may also intercept and process traffic on other subnets 120.

For the purposes of illustration, the following examples discuss in detail the deployment of decoys using DHCP according to some embodiments, in cooperation with DHCP server 110; however, other protocols and servers designed to assist devices to connect to the network and obtain addresses may also be used. In this example, on client subnet 104, DHCP server 110 controls the assignment of addresses to devices including desktop personal computers, laptops, IP addressable handhelds, phones as well as any other mobile and semi-mobile devices. Each address is assigned to a device for a period of time referred to as the lease time. After the expiration of the lease time, the device requests a new address if it is still connected to the network.

In this embodiment, decoy server 108 cooperates with DHCP server 110 to obtain dynamic decoy addresses using DHCP protocol in a manner similar to other devices. When populating a network, decoy server 108 is able to automatically obtain and assign dynamic addresses, and reduce the number of decoy addresses it uses in the event that there is a shortage of free addresses for other devices. Decoy server 108 may also be configured to deploy decoys on other networks. In some embodiments, each subnet has its own decoy server.

For the purposes of illustration, decoy server 108 is shown to perform the deployment of decoy addresses. In some embodiments, the deployment capability may be included in a decoy manager that communicates with the decoy server or directly with the decoys. Decoy server 108, decoys 102 and 106 and DHCP server 110 may be separate devices or processes in some embodiments; in some embodiments, some of these components may be combined.

Figure 2A:
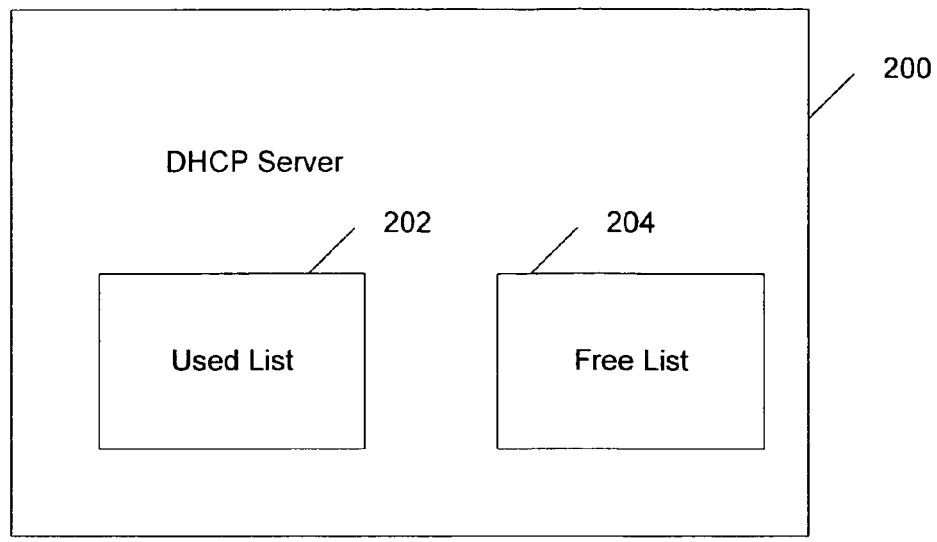
FIG. 2A is a block diagram illustrating some of the data structures used by a dynamic host configuration protocol server according to one embodiment.

In some embodiments, the DHCP server and the decoy server are configured to track the addresses so that used addresses are not reassigned. The decoy server also tracks the decoy addresses so that they may be reused. Examples of the data structures used for tracking purposes are shown below. FIG. 2A is a block diagram illustrating an example of the data structures used by a dynamic host configuration protocol server. DHCP server 200 shown in this example may be used by the network shown in FIG. 1 as well as other networks. In this embodiment, DHCP server 200 records the addresses on the network available for assignment in a free list 204. It also responds to address requests by selecting an address from its free list and assigning it to the device. Once an address is assigned to a device, it is removed from the free list and added to a used list 202. DHCP server 200 also tracks the expiration time for each of the addresses in the used list.

Figure 2B:
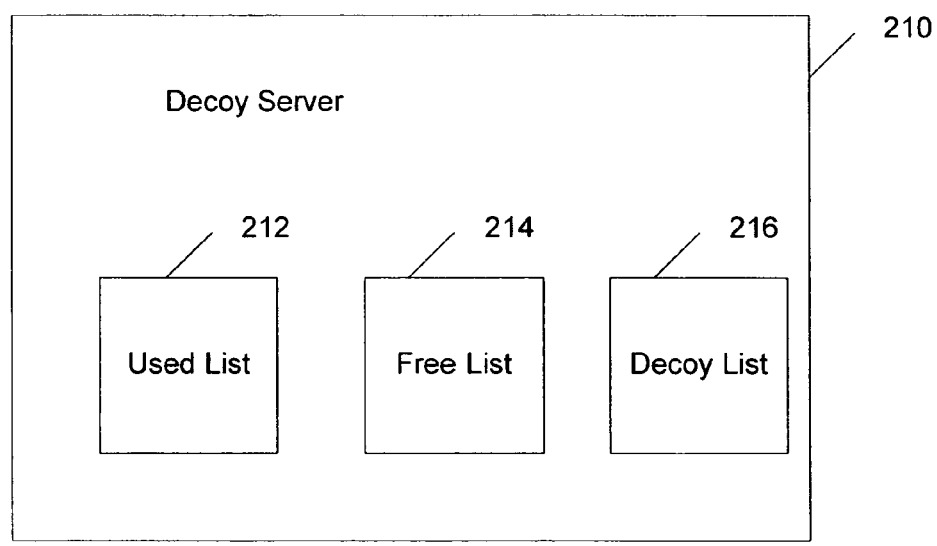
FIG. 2B is a block diagram illustrating some of the data structure used by a decoy server according to one embodiment.

FIG. 2B is a block diagram illustrating some of the data structure used by a decoy server according to one embodiment. Decoy server 210 shown in this example may be used by the network shown in FIG. 1 as well as other networks. In this example, decoy server 210 also includes a used list 212 and a free list 214 that are equivalent to used list 202 and free list 204 shown in FIG. 2A. Additionally, decoy server 210 maintains a decoy list 216 that stores the addresses used by the decoys. Decoy server 210 is capable of requesting and releasing IP addresses using DHCP the way a real device would. Upon receiving an address request from the decoy, DHCP server 200 takes a free address, returns it to the decoy server and moves the address to the used list. Decoy server 210 then stores the address on the decoy list and initializes the services for the address received. Decoy server 210 also tracks the release time of the decoy addresses and renews them as necessary. In some embodiments, decoy server 210 is integrated into the DHCP server and shares the free and used lists with DHCP server 200 for increased efficiency. Note that although lists are shown in this example, tables, trees, or any other appropriate data structures may also be used.

Figure 3:
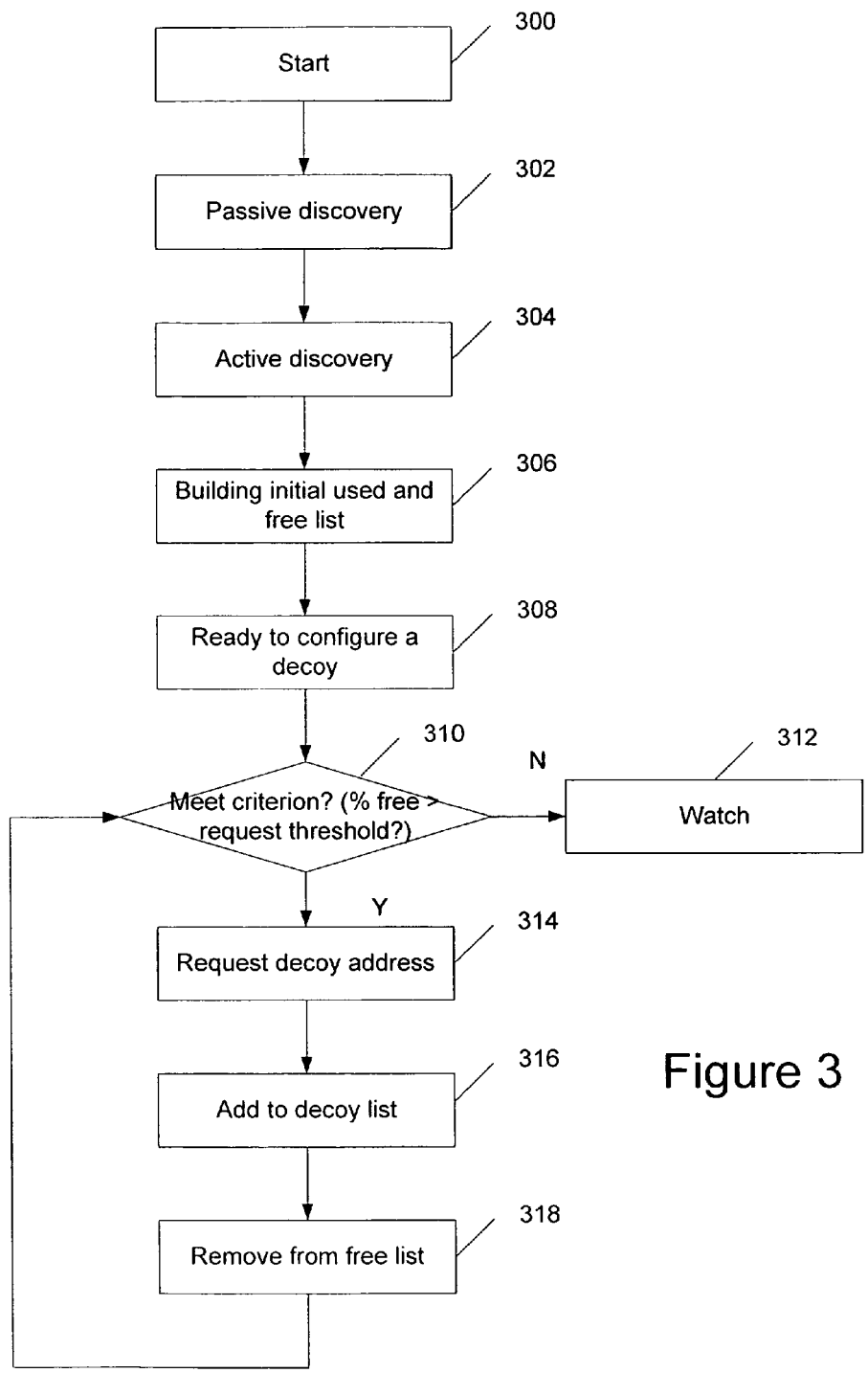
FIG. 3 is a flowchart illustrating the deployment of a decoy in a network according to one embodiment.

FIG. 3 is a flowchart illustrating the deployment of a decoy in a network according to one embodiment. In this example, at start time the decoy performs initialization procedures such as reading configuration files (300). Since the network may already be populated, configuration information about the network is then obtained. A passive discovery process is first performed to determine which addresses are on the network (302). In some embodiments, the passive discovery process is a fuzzy logic approach where the decoy server observes traffic on the network and develops its used and free lists accordingly. In some embodiments, the router or firewall logs may be monitored to determine what is on the network. The length of the passive discovery is configurable by the network's administrator and may range from several minutes to several hours for some embodiments. After the passive discovery process, an active discovery process is performed (304). In some embodiments, active discovery involves sending address resolution protocol (ARP) requests and determining what addresses are in use based on any response it may receive; in some embodiments, active discovery involves sending Internet Control Message Protocol (ICMP) messages (also known as "pings"). Other appropriate protocols or techniques for active discovery may also be used. The decoy server then builds its initial used and free lists based on the result of the discovery (306).

In some embodiments, the decoy is to be deployed with as little impact on the network as possible, thus only passive discovery is performed. In some embodiments, the network is insensitive to the deployment of the decoy (for example, if the decoy is deployed at night when few users are on the network), thus only active discovery is performed. In some embodiments, a combination of passive and active discovery is performed. In some embodiments, the decoy communicates with the DHCP server or is an integral part of the DHCP server, thus is able to obtain the used and free list directly and omit the discovery process. In some embodiments, because of its discovery capabilities, the decoy does not require changes on the DHCP server and is compatible with existing networks.

In the example of FIG. 3, the system is shown to be ready to configure a decoy (308). Configuring a decoy may include adding the decoy and assigning a decoy address, removing the decoy and releasing the decoy address, as well as any other activities related to managing the decoy. Although having more decoys on the network provides better intrusion detection, too many decoy addresses and not enough free addresses may prevent real devices from obtaining addresses and disrupt the normal operations of the network. Thus, in some embodiments, there is a criterion governing the configuration of the decoy in order to maintain a balance in the numbers of decoy addresses and free addresses on the network. For example, whether a new decoy address should be requested or whether an existing decoy address should be released to the free list may depend on the proportion of free addresses or the proportion of used addresses on the network.

In some embodiments, the criterion is based on the distribution of addresses on the network. The distribution may include the number or percentage of free addresses, used addresses, and/or decoy addresses on the network, or any other appropriate quantities related to the addresses on the network. A request threshold above which more decoy addresses are requested and a release threshold below which some decoy addresses are freed may be predefined. In this example, the thresholds are based on the percentage of free addresses with respect to all the addresses on the network. A request threshold of 30% free addresses and a release threshold of 15% free addresses are used in this example. In some embodiments, the request threshold and the release threshold are the same.

It is then determined whether the network information that has been gathered meets the criterion. In this example, it is determined whether the percentage of free addresses is greater than the request threshold (310). For example, if 70% of the addresses on the network are free and the request threshold is 30% free addresses, then a request for decoy address is sent to the DHCP server (314). The decoy address is added to the decoy list (316) and removed from the free list (318). The request threshold and free percentage are then compared again (310). When the percentage of free addresses eventually falls below the request threshold, the decoy stops requesting any more addresses and begins a watch process (312).

Figure 4:
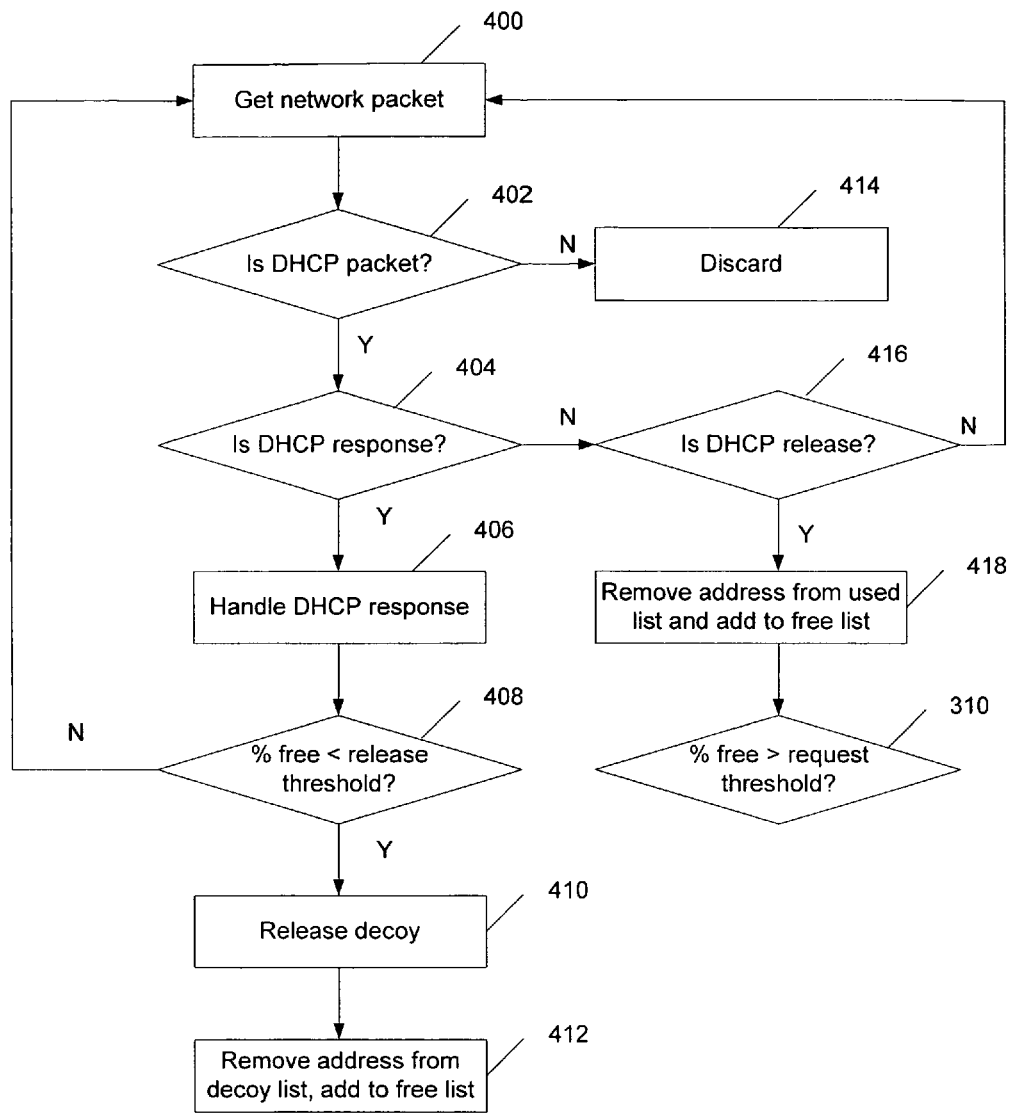
FIG. 4 is a flowchart illustrating the watch process (312) shown in FIG. 3 according to one embodiment.

FIG. 4 is a flowchart illustrating the watch process (312) shown in FIG. 3 according to one embodiment. In this embodiment, the decoy server operates in promiscuous mode to observe the traffic on the network in order to make decisions on whether to release its decoy addresses and maintain the percentage of free addresses. In some embodiments, the decoy server observes the traffic by monitoring log files or other inputs. During the watch process, the decoy gets a network packet (400) and determines whether it is a DHCP packet (402). If the packet is not a DHCP packet, it does not affect the address assignment on the network and is therefore discarded (414). If the packet is a DHCP packet, it is determined whether it is a DHCP response (404). If the packet is not a DHCP response, it is determined whether it is a DHCP release request (416). If the packet is not a DHCP release request, the next network packet is then obtained and examined (400); otherwise, receiving the DHCP release request indicates that the address associated with the packet has been released by the device that was previously assigned with the address. The address is then removed from the used list and added to the free list (418), and control is transferred to 310 of FIG. 3 to determine whether the percentage of free addresses is greater than the request threshold. 310 through 318 are then repeated. If the packet is a DHCP response, it is processed in order to update the used and free lists (406). Details of how the DHCP response is handled are discussed below.

It is then determined whether the decoy should release a decoy address to make the address available to other devices (408). In this embodiment, the criterion used for determining whether to release a decoy address is whether the percent of free addresses is less than the release threshold. If the percentage of free addresses is greater or equal to the release threshold, the decoy does not need to release any decoy addresses and the process is repeated (400). If, however, the percentage of free addresses is less than the release threshold (for example, 14% of addresses are free while the release threshold is set to 15% of free addresses), a decoy address is released in order to maintain the percentage of free addresses at or above the release threshold (410). The address is removed from the decoy list and added to the free list (412).

Figure 5:
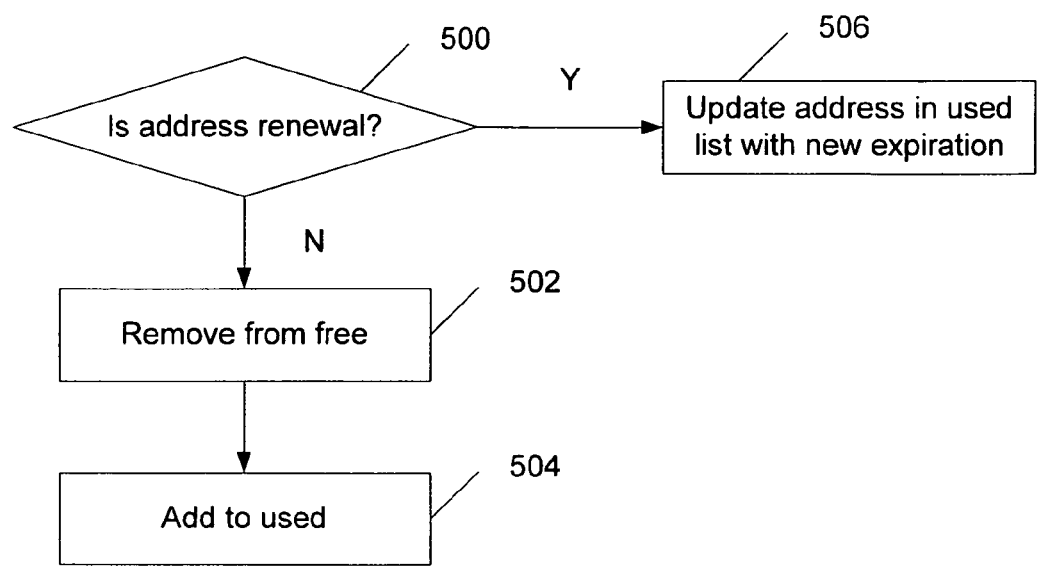
FIG. 5 is a flowchart illustrating details of handling DHCP response (406) shown in FIG. 4 according to one embodiment.

FIG. 5 is a flowchart illustrating details of handling DHCP response (406) shown in FIG. 4 according to one embodiment. The DHCP response may be a response from a new client or the response from an existing client for its renewal. In this example, it is determined whether the response is an address renewal (500). If it is a renewal response, the new expiration time of the address is updated in the used list (506). If it is not an address renewal, the response is a response from a new client and the corresponding address is removed from the free list (502) and added to the used list (504).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for providing computer security, comprising:
    Obtaining, using hardware processor, network configuration information regarding a dynamic network at a decoy server connected to the network;
    determining, using at least one hardware processor, whether the network configuration information meets a criterion that at least in part relates to a configuration of the network, wherein determining whether the network configuration information meets the criterion comprises determining used and free addresses on the network and determining whether a percentage of free addresses on the network is greater than a request threshold;
    in the event the configuration information meets the criterion, adding a decoy to the network; and
    in the event the configuration information does not meet the criterion, observing traffic on the network to determine if a decoy should be removed from the network.

2. The method for providing computer security as recited in claim 1, wherein the network configuration information includes a distribution of a plurality of addresses on the network.

3. The method for providing computer security as recited in claim 1, wherein obtaining the network configuration information includes cooperating with a server to obtain the network configuration information.

4. The method for providing computer security as recited in claim 1, wherein obtaining the network configuration information includes cooperating with a dynamic host configuration protocol (DHCP) server to obtain the network configuration information.

5. The method for providing computer security as recited in claim 1, wherein determining whether the network configuration information meets the criterion includes discovering a used address on the network using passive discovery.

6. The method for providing computer security as recited in claim 1, wherein determining whether the network configuration information meets the criterion includes discovering a used address on the network using passive discovery by observing traffic on the dynamic network.

7. The method for providing computer security as recited in claim 1, wherein determining whether the network configuration information meets the criterion includes discovering a used address on the network using passive discovery by monitoring a log.

8. The method for providing computer security as recited in claim 1, wherein determining whether the network configuration information meets the criterion includes discovering a used address on the network using active discovery.

9. The method for providing computer security as recited in claim 1, wherein determining whether the network configuration information meets the criterion includes discovering a used address on the network using active discovery by sending an address resolution protocol (ARP) request.

10. The method for providing computer security as recited in claim 1, wherein determining whether the network configuration information meets the criterion includes discovering a used address on the network using active discovery by sending an Internet Control Message Protocol (ICMP) message.

11. The method for providing computer security as recited in claim 1, wherein determining whether the network configuration information meets the criterion includes determining a distribution of addresses on the network.

12. The method for providing computer security as recited in claim 1, wherein determining whether the network configuration information meets the criterion further includes determining whether a percentage of free addresses on the network is less than a release threshold.

13. The method for providing computer security as recited in claim 1, wherein the decoy is added or removed automatically.

14. The method for providing computer security as recited in claim 1, wherein adding the decoy includes obtaining a free address and assigning the free address to the decoy.

15. The method for providing computer security as recited in claim 1, wherein adding the decoy includes adding a decoy address to a decoy list and removing the decoy address from a free list.

16. The method for providing computer security as recited in claim 1, wherein the added decoy is integrated with a dynamic host configuration protocol (DHCP) server.

17. The method for providing computer security as recited in claim 1, further comprising handling a dynamic host configuration protocol (DHCP) response.

18. A system for providing computer security, comprising:
at least one hardware processor configured to obtain network configuration information regarding a dynamic network at a decoy server connected to the network, to determine whether the network configuration information meets a criterion that at least in part relates to a configuration of the network, to add a decoy to the network in the event the configuration information meets the criterion, and to observe traffic on the network to determine if a decoy should be removed from the network in the event the configuration information does not meet the criterion, wherein determining whether the network configuration information meets the criterion comprises determining used and free addresses on the network and determining whether a percentage of free addresses on the network is greater than a request threshold; and
a memory coupled with the at least one hardware processor, wherein the memory is configured to provide the at least one hardware processor with instructions.

19. A computer program product for providing computer security, the computer program product being embodied in a non-transitory computer readable medium and comprising computer instructions for:
obtaining network configuration information regarding a dynamic network at a decoy server connected to the network;
determining whether the network configuration information meets a criterion that at least in part relates to a configuration of the network, wherein determining whether the network configuration information meets the criterion comprises determining used and free addresses on the network and determining whether a percentage of free addresses on the network is greater than a request threshold;
in the event the configuration information meets the criterion, adding a decoy to the network; and
in the event the configuration information does not meet the criterion, observing traffic on the network to determine if a decoy should be removed from the network.

* * * * *